2,918,374

MEAT-PRODUCT

Eugene M. Fresch, Hannibal, N.Y.

No Drawing. Application May 3, 1957
Serial No. 656,770

2 Claims. (Cl. 99—107)

This invention relates to a food product consisting substantially of meat composition in packed and frozen form.

The object of the invention is to provide a food embodying the meat in mixed particle form which will be wholesome and self-preservative and inexpensive, and this application is a continuation-in-part of my United States Patent 2,791,507.

A further object is to provide a method of preparation which will be simple and effective in handling and mixing the ingredients in uniform blend insuring the desired conditioning of the meat particles in the final product.

The meat, for instance horsemeat, is cut to particle size of desired fineness, the particle surfaces being normally of dark red coloring, noticeably darker red in coloring than beef, for instance.

Horsemeat, as an example, is a muscle meat of relatively hard structure of fine texture and in my composition I have found that it may be effectively converted to a beef-like appearance and coloring by a surface filming of the particles with a semi-liquid form of natural glandular material derived from red bloody internal organs of cattle, swine, sheep and the like. These parts, termed melts, are usually long, flat, slender glands and under the shredding and grinding as hereinafter described tend to liquefy to semi-liquid condition.

Instead of beef or horsemeat, other inexpensive red meat such as whale meat may be used and will be maintained in appearance by the coloring resulting from the surface coating of the meat particles by the intensely red semi-liquid melt material.

The bulk of the materials, normally frozen, is shredded in an impact disintegrator and then is ground in a sausage grinder to a fineness readily passing through a ⅛" plate of the grinder, the machinery involved being heavy and handling substantial quantities of the meat. During the shredding, grinding and mixing, the temperature rises to 35° to 40° F. to condition the materials for packaging. The shredding effort applied is kept moderate to avoid any friction or local concentration of energy tending to spot discoloration. The meat will thus flow without jamming or overheating and pass freely through the machining to attain clean cutting of the particle surfaces with consequent regularity in graining and a nice looking surface effect in the finished product.

The horsemeat or the like is worked up to particle form under this shredding effort which is applied thus without excessive friction or such concentration as to result in overwork or overheating and the result is an even disintegration of the material into definite small particles having clean cut surfaces presenting even coloring throughout. With this the composition may include, preferably in minor proportion, a similarly shredded meat by-product such as tripe, soft tissue, cattle lips, cheeks and the like.

For instance, thirty to fifty percent red meat may be worked in with twenty-five to forty percent tripe or other substitute. After shredding to desired fineness while still preserving the clean particle surfacing to receive the filming by the semi-liquid melt material, ten to thirty percent of the latter is uniformly distributed in the whole composition. A typical composition provides forty-five percent red meat, forty percent substitute and the remainder the melt material in thorough distribution acting as a coloring and completing the combination which is practically self-preservative where substantially thirty to fifty percent and over is used of the red meat, with the careful shredding and grinding and distribution of the product under refrigeration.

Where desired, particularly with less red meat, an additional preservative such as ascorbic acid may be added in slight amount of one gram or less to five or more pounds of the composition, depending on the materials and the conditions of distribution.

Before mixing for the actual blending process, the proportions of the various ingredients are predetermined with the addition of small amounts of desired flavoring or sources of calcium and the like.

A typical mixture will comprise percentages about as follows:

30%, or more, by weight of red meat;
40%, or more, by weight of substitute material; and
10%, or more, by weight of the melt material mixed in with the meat particles, all similarly shredded and ground.

In general the food product of this invention comprises at least ten percent shredded and sharply ground particles of red meat intimately mixed with not over eighty percent meat substitute similarly shredded and ground. Preferably, however, the food product contains not over sixty percent meat substitute particles.

The melts forming the melt material are long, flat, slender glands consisting of a red bloody substance which is allowed to thaw to a higher temperature, 45–50° F., for instance, before or during the shredding and grinding so that it will nearly liquefy. Lighter and darker melts may be blended and higher temperatures will in general darken the coloring.

In this softened form it will be distributed through the mixture, bringing it in a short time to a thorough blend in which the by-product particles, by merger and coating with the material of the melts, have imparted to them an attractive, beefy, red coloration. This permeation of the mixture and coating of the particles is vital in the completion of the mixture and it is critically important to preserve the resulting composition.

It has proven advantageous to add this filming melt material in the mixture after the grinding of the ingredients to effectively spread it throughout the mixture for thorough coating of the particles.

On completion of the final blending with the protective coating of the particles, the composition is ready for packaging, freezing and storage and transportation.

The dispersion of the soft material of the melts blends itself throughout the other meat products imparting a uniform coloring and consolidating the mass. The resultant appearance is that of a beef hamburger and is very attractive and appetizing. The melts employed may be those of cattle, swine, sheep and the like and are found to commingle equally effectively with the various by-product meats; they also are thoroughly compatible and cooperative with the surfacing of the particles by the protective film of melt material.

The red meat particles constitute substantially more than ten percent of the mixture and correspondingly improve the composition and lengthen the life and avoid artificial preservative, preferably included in blends with less than fifty percent well chosen and treated red meat and practically required where the red meat is less than thirty percent.

The special shred and cut formation of the clear surfaced particles, avoiding local temperature rise, and the thorough filming of the clean cut particle surfaces contribute to the preservative characteristics of the composition and maintain the desired beef like coloring over long periods of storage under refrigeration. The composition itself is simplified and is compatible with intermixtures of healthful additions of bone meal, vitamins and the like, really improving the quality of the product as a digestible foodstuff.

An outstanding quality of the new composition is the persistence with which the beefy coloring is maintained under practical conditions of distribution. The attractive appearance of freshness with hardly noticeable deterioration is preserved under normal transit and storage with refrigeration over periods up to as long as three months. This is particularly remarkable with the composition embodying the higher percentages of red meat in that substantially no artificial preservative is required and in the lower percentages only a relatively minor amount of preservative is necessary. The conditioning of the meat particles themselves and the surfacing with the melt material is effective in producing and maintaining the highly attractive appearance.

I claim:

1. A food product comprising at least ten percent shredded and sharply ground particles of red meat intimately mixed with not over eighty percent nor less than twenty-five percent meat substitute particles similarly shredded and ground, all intermixed with an edible preservative and all of said particles having clean cut surfaces coated with at least ten percent but not more than thirty percent melt material in particle surfacing films imparting a beefy, red coloring to the mixture evenly distributed and constituting with said red meat and substitute meat substantially the entire composition and maintaining a desired appearance of freshness in transit and storage under refrigeration for long periods.

2. A food product comprising at least thirty percent shredded and sharply ground particles of red meat intimately mixed with not over sixty percent nor less than twenty-five percent meat substitute particles similarly shredded and ground, all of said particles having clean cut surfaces coated with at least ten percent but not more than thirty percent melt material in particle surfacing films imparting a beefy red coloring to the mixture evenly distributed and constituting with said red meat and substitute meat substantially the entire composition and maintaining a desired appearance of freshness in transit and storage under refrigeration for long periods.

References Cited in the file of this patent

UNITED STATES PATENTS

| | | |
|---|---|---|
| 2,567,085 | Stoloff | Sept. 4, 1951 |
| 2,622,027 | Torr | Dec. 16, 1952 |
| 2,622,028 | Torr | Dec. 16, 1952 |
| 2,622,029 | Torr | Dec. 16, 1952 |
| 2,791,507 | Fresch | May 7, 1957 |